United States Patent
Wada et al.

(10) Patent No.: US 6,304,157 B1
(45) Date of Patent: Oct. 16, 2001

(54) HIGH-FREQUENCY DIELECTRIC CERAMIC COMPOSITION, DIELECTRIC RESONATOR, DIELECTRIC FILTER, DIELECTRIC DUPLEXER, AND COMMUNICATION APPARATUS

(75) Inventors: Takaya Wada, Omihachiman; Hiroshi Tamura, Otsu, both of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/545,819

(22) Filed: Apr. 7, 2000

(30) Foreign Application Priority Data

Apr. 9, 1999 (JP) .................................. 11-102961

(51) Int. Cl.[7] .............................. H01P 1/20; H01P 7/00; H03H 7/46; C04B 35/46
(52) U.S. Cl. ...................... 333/202; 333/219; 333/132; 501/137; 501/138
(58) Field of Search ................. 333/202, 222, 333/219, 132, 134; 501/137, 138

(56) References Cited

U.S. PATENT DOCUMENTS

| | | | |
|---|---|---|---|
| 5,077,247 | * 12/1991 | Sato et al. | 501/137 |
| 5,130,281 | * 7/1992 | Sano et al. | 501/138 |
| 5,256,639 | * 10/1993 | Fujimaru et al. | 501/137 |
| 5,493,262 | * 2/1996 | Abe et al. | 333/219 |

FOREIGN PATENT DOCUMENTS 63-237304   10/1988   (JP) .

OTHER PUBLICATIONS

Patent Abstracts of Japan, vol. 017, No. 630 (E–1463), Nov. 22, 1993 and JP 05 205520 A (Nippon Steel Corp.) Aug. 13, 1993, Abstract.

Patent Abstracts of Japan, vol. 018, No. 210 (E–1537), Apr. 14, 1994 and JP 06 012915 A (Denki Nagaku Kogyo KK) Jan. 21 1994, Abstract.

Patent Abstracts of Japan, vol. 018, No. 210 (E–1537), Apr. 14, 1994 and JP 06 012913 A (Denki Nagaku Kogyo KK) Jan. 21, 1994, Abstract.

Patent Abstracts of Japan, vol. 018, No. 434 (E–1592), Aug. 12, 1994 and JP 06 139820 A (Ube Ind. Ltd.) May 20, 1994, Abstract.

* cited by examiner

*Primary Examiner*—Robert Pascal
*Assistant Examiner*—Patricia T. Nguyen
(74) *Attorney, Agent, or Firm*—Ostrolenk, Faber, Gerb & Soffen, LLP

(57) ABSTRACT

A high-frequency dielectric ceramic composition comprises Ba, Ti, Nd, Sm, and Pr as primary components represented by the formula $xBaO\text{-}yTiO_2\text{-}z\{(1-m-n)Nd_2O_3\text{-}mSm_2O_3\text{-}nPr_2O_{11/3}\}$ wherein coefficients x, y, z, m, and n represent molar ratios, $x+y+z=1$, $0<m\leq 0.40$, $0<n\leq 0.25$, and the coefficients x, y, and z are in an area bounded by points A, B, C and D in a ternary diagram, wherein point A is at (x=0.16, y=0.70, z=0.14), point B is at (x=0.16, y=0.68, z=0.16), point C is at (x=0.13, y=0.68, z=0.19), and point D is at (x=0.13, y=0.70, z=0.17); wherein the composition further comprises a Bi compound in an amount of more than 0 parts by weight to about 9 parts by weight on the basis of $Bi_2O_3$ and an Fe compound in an amount of more than 0 parts by weight to about 0.3 parts by weight on the basis of $Fe_2O_3$ as additional components with respect to 100 parts by weight of the primary components. The high-frequency dielectric ceramic composition exhibits high reduction resistance during a sintering process, has a high relative dielectric constant $\epsilon_r$ and a stable Q value in a microwave band, and can control the temperature coefficient $\tau f$ of the resonant frequency to an appropriate value in the vicinity of zero ppm/° C.

20 Claims, 4 Drawing Sheets

US 6,304,157 B1

HIGH-FREQUENCY DIELECTRIC CERAMIC COMPOSITION, DIELECTRIC RESONATOR, DIELECTRIC FILTER, DIELECTRIC DUPLEXER, AND COMMUNICATION APPARATUS

BACKGROUND OF THE INVENTION

1. Field of the Invention

The present invention relates to a high-frequency dielectric ceramic composition, and to a dielectric resonator, a dielectric filter, a dielectric duplexer, and a communication apparatus using the same.

2. Description of the Related Art

Dielectric ceramic components are widely used as dielectric resonators and dielectric filters which are mounted in electronic devices, such as portable phones, personal radio equipment and satellite broadcasting receivers, used in high-frequency bands including microwave bands and millimeter-wave bands. These high-frequency dielectric ceramic components require high dielectric constants and high Q values, and adjusting of the temperature coefficient of the resonant frequency to appropriate values near zero.

Examples of disclosed dielectric ceramic compositions include a $BaO-Nd_2O_3-TiO_2-PbO$ composition (disclosed in Japanese Examined Patent Publication No. 56-26321), a $BaO-Nd_2O_3-TiO_2-Bi_2O_3$ composition (disclosed in Japanese Examined Patent Publication No. 59-51091), a $BaO-Nd_2O_3-Ce_2O_4-Sm_2O_3-TiO_2-Bi_2O_3-Fe_2O_3$ composition (disclosed in Japanese Laid-open No. 63-237304), and a $BaO-Nd_2O_3-Sm_2O_3-TiO_2-Bi_2O_3$ composition (disclosed in Japanese Laid-open No. 4-104946).

These conventional $BaO-Nd_2O_3-TiO_2-PbO$ and $BaO-Nd_2O_3-TiO_2-Bi_2O_3$ compositions have low Q values with respect to relative dielectric constants $\in_r$, which are of insufficient levels for dielectric resonators. In the $BaO-Nd_2O_3-Ce_2O_4-Sm_2O_3-TiO_2-Bi_2O_3-Fe_2O_3$ composition, the Q value is improved but relative dielectric constant is decreased to an insufficient level in practical use by the addition of $Fe_2O_3$. Although the $BaO-Nd_2O_3-Sm_2O_3-TiO_2-Bi_2O_3$ composition has a high Q value, the Q value is unstable due to oxygen defects which are formed by reduction during the sintering process.

SUMMARY OF THE INVENTION

Accordingly, it is an object of the present invention to provide a high-frequency dielectric ceramic composition which does not cause the formation of oxygen defects, that is, exhibits high reduction resistance during sintering, which has a high relative dielectric constant $\in_r$ and a stable Q value in the microwave band, and which can control the temperature coefficient τf of the resonant frequency to an appropriate value in the vicinity of zero ppm/° C.

It is another object of the present invention to provide a dielectric resonator, a dielectric filter, a dielectric duplexer and communication apparatus using this high-frequency dielectric ceramic composition.

According to an aspect of the present invention, a high-frequency dielectric ceramic composition comprises Ba, Ti, Nd, Sm and Pr as primary components represented by the formula $xBaO-yTiO_2-z\{(1-m-n)Nd_2O_3-mSm_2O_3 nPr_2O_{11/3}\}$ wherein coefficients x, y, z, m, and n represent molar ratios, $x+y+z=1$, $0<m\leq0.40$, $0<n\leq0.25$, and the coefficients x, y, and z are in an area bounded by points A, B, C and D in a ternary diagram, wherein point A is at (x=0.16, y=0.70, z=0.14), point B is at (x=0.16, y=0.68, z=0.16), point C is at (x=0.13, y=0.68, z=0.19), and point D is at (x=0.13, y=0.70, z=0.17); wherein the composition further comprises a Bi compound in an amount of more than 0 parts by weight to about 9 parts by weight in terms of $Bi_2O_3$ and an Fe compound in an amount of more than 0 parts by weight to about 0.3 parts by weight in terms of $Fe_2O_3$ as additional components with respect to 100 parts by weight of the primary components.

According to another aspect of the present invention, a dielectric resonator comprises a dielectric ceramic component and input/output terminals, the dielectric resonator operating by electromagnetically coupling the dielectric ceramic component to the input/output terminals, wherein the dielectric ceramic component comprises the above high-frequency dielectric ceramic composition.

According to another aspect of the present invention, a dielectric filter comprises the above dielectric resonator and external coupling means.

According to another aspect of the present invention, a dielectric duplexer comprises at least two dielectric filters, input/output connecting means, each connected to each of the dielectric filters, and an antenna connecting means commonly connected to the dielectric filters, wherein at least one of the dielectric filters is the above dielectric filter.

DESCRIPTION OF THE PREFERRED EMBODIMENTS

Figure 1:
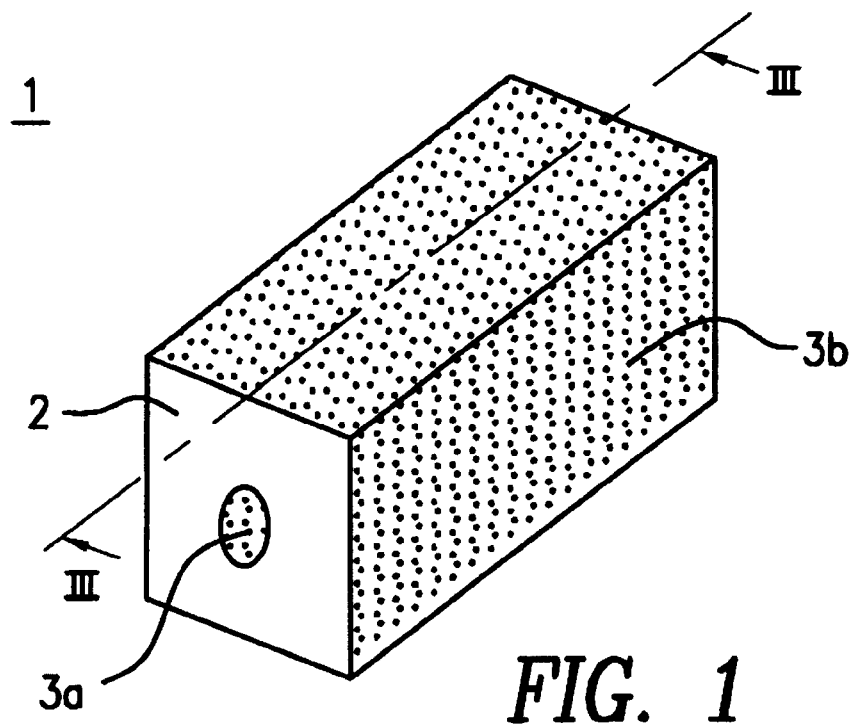
FIG. 1 is an isometric view of a dielectric resonator of the present invention.
Figure 2:
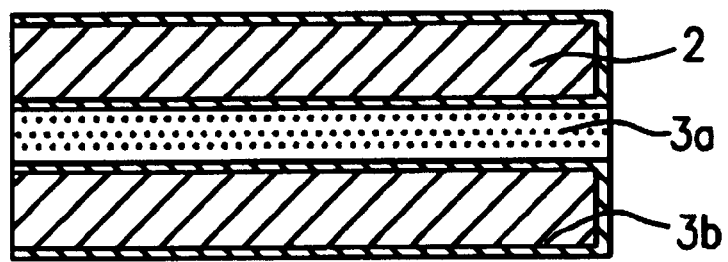
FIG. 2 is a cross-sectional view taken along line III—III in FIG. 1.

FIG. 1 is an isometric view of a dielectric resonator of the present invention, and FIG. 2 is a cross-sectional view taken along line III—III in FIG. 2. With reference to FIGS. 1 and 2, the dielectric resonator 1 is of a transverse electromagnetic (TEM) mode type and is composed of a prismatic dielectric ceramic component 2 having a through-hole which is filled with an internal conductor 3a. The sides of the dielectric resonator 1 are covered with an external conductor 3b. When the dielectric ceramic component 2 is electromagnetically coupled with input/output terminals, that is, external couplers, the dielectric ceramic component 2 functions as a dielectric resonator. The dielectric ceramic component 2 is composed of a high-frequency dielectric ceramic composition in accordance with the present invention.

Shapes other than the prismatic shape and modes other than the TEM mode, such as a transverse magnetic (TM) mode and a transverse electric (TE) mode, may be employed in the present invention.

Figure 3:
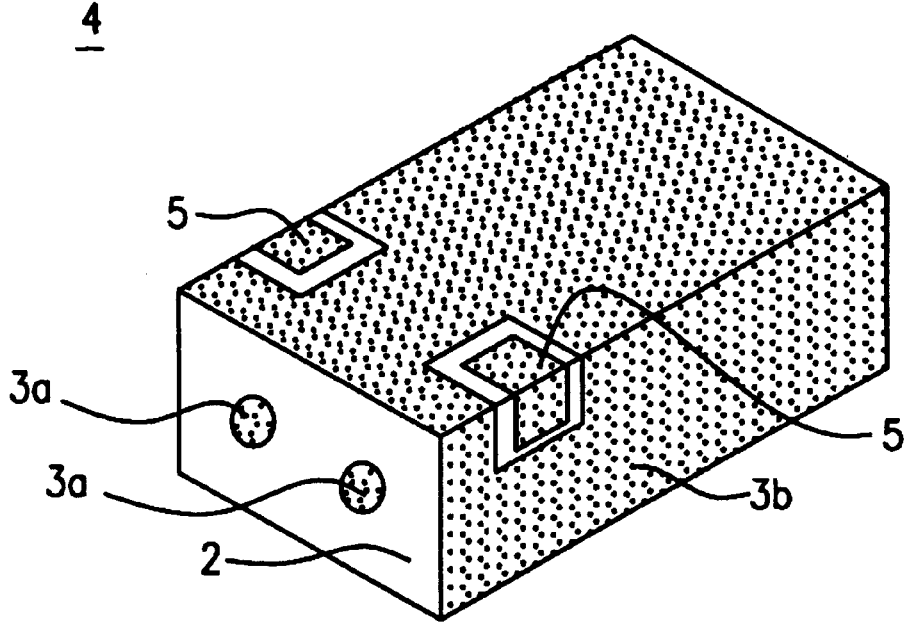
FIG. 3 is an isometric view of a dielectric filter in accordance with the present invention.

FIG. 3 is an isometric view of a dielectric filter in accordance with the present invention. The dielectric filter 4 includes the above dielectric resonator, which is composed of the above dielectric ceramic component 2 having the through-hole, the internal conductor 3a and the external conductor 3b, and an external coupler 5. Although the dielectric filter 4 shown in FIG. 3 is a block type, the dielectric filter 4 may be a discrete type.

Figure 4:
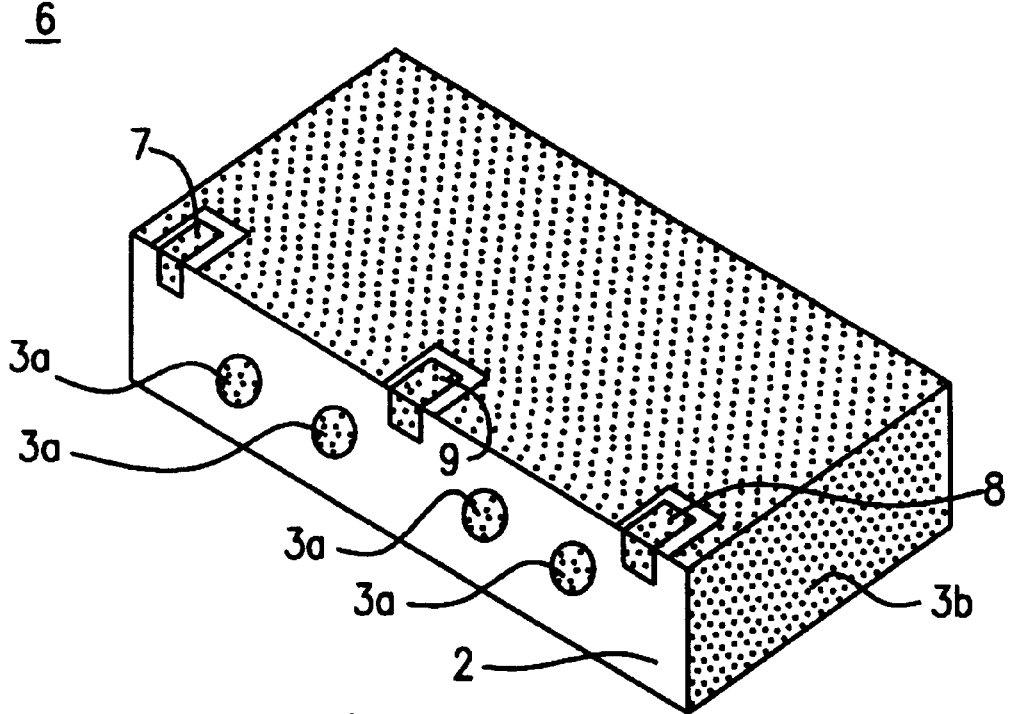
FIG. 4 is an isometric view of a dielectric duplexer in accordance with the present invention.

FIG. 4 is an isometric view of a dielectric duplexer in accordance with the present invention. The dielectric duplexer 6 includes two dielectric filters, an input connector 7 connected to one of the dielectric filters, an output connector 8 connected to the other dielectric filter, and an antenna connector 9 commonly connected to these two dielectric filters. Each dielectric filter is composed of the dielectric ceramic component 2 having the through-hole, the internal conductor 3a, and the external conductor 3b. Although the dielectric duplexer 6 shown in FIG. 4 is a block type, the dielectric duplexer 6 may be a discrete type.

Figure 5:
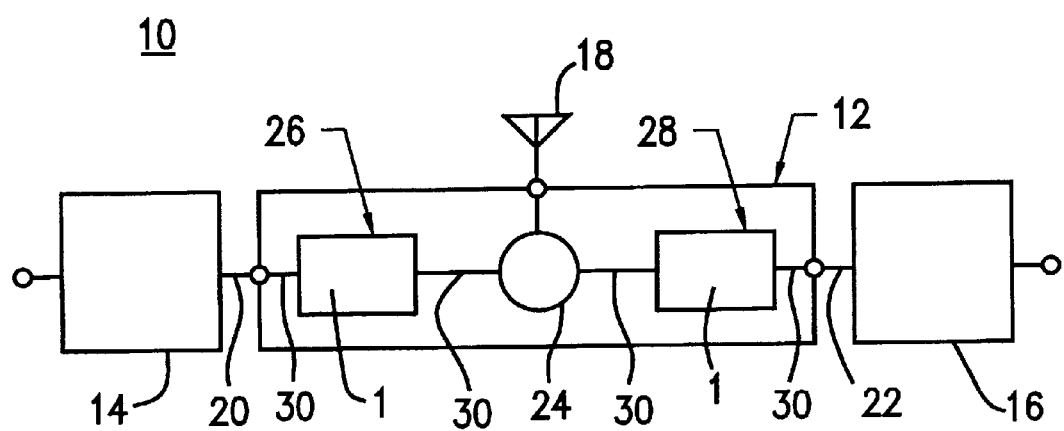
FIG. 5 is a block diagram of a communication apparatus in accordance with the present invention.

FIG. 5 is a block diagram of a communication apparatus in accordance with the present invention. The communication apparatus 10 includes a dielectric duplexer 12, a transmission circuit 14, a receiving circuit 16, and an antenna 18. The transmission circuit 14 is connected to an input connector 20 of the dielectric duplexer 12, and the receiving circuit 16 is connected to an output connector 22 of the dielectric duplexer 12. The antenna 18 is connected to an antenna connector 24 of the dielectric duplexer 12. The dielectric duplexer 12 includes two dielectric filters 26 and 28. Each of the dielectric filters 26 and 28 is composed of the above dielectric resonator 1 and external coupler 30. The dielectric filter 26 is connected between the input connector 20 and the antenna connector 24, and the dielectric filter 28 is connected between the antenna connector 24 and the output connector 22.

Figure 6:
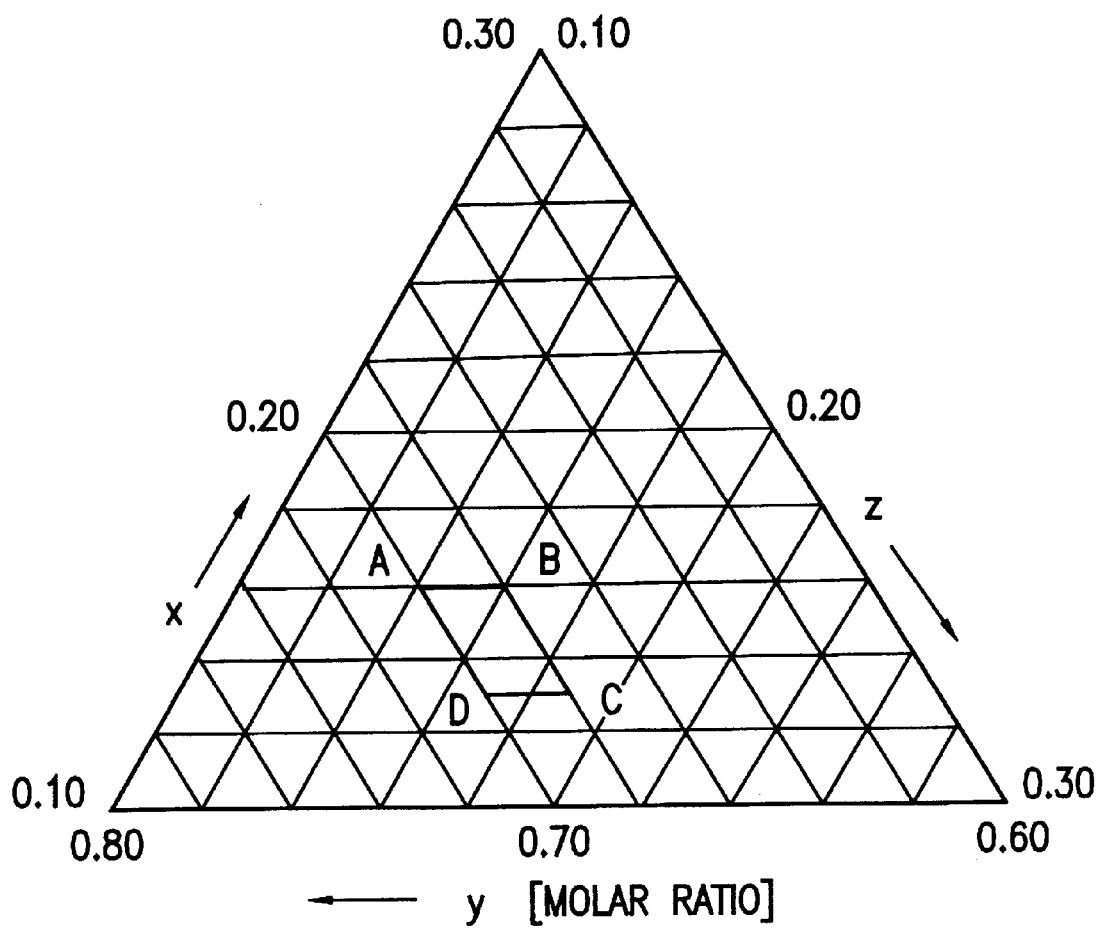
FIG. 6 is a ternary diagram representing the ratio of primary components in a high-frequency dielectric ceramic composition in accordance with the present invention.

The high-frequency dielectric ceramic composition of the present invention contains Ba, Ti, Nd, Sm and Pr as primary components represented by the formula $xBaO\text{-}yTiO_2\text{-}z\{(1\text{-}m\text{-}n)Nd_2O_3\text{—}mSm_2O_3\text{-}nPr_2O_{11/3}\}$ wherein coefficients x, y, z, m, and n represent molar ratios, $x+y+z=1$, $0<m\leq0.40$, $0<n\leq0.25$, and the coefficients x, y, and z are in an area bounded by points A, B, C and D in a ternary diagram, as shown in FIG. 6: point A (x=0.16, y=0.70, z=0.14), point B (x=0.16, y=0.68, z=0.16), point C (x=0.13, y=0.68, z=0.19), and point D (x=0.13, y=0.70, z=0.17); wherein the composition further comprises a Bi compound in an amount of more than 0 parts by weight to about 9 parts by weight on the basis of $Bi_2O_3$ and an Fe compound in an amount of more than 0 parts by weight to about 0.3 parts by weight on the basis of $Fe_2O_3$ as additional components with respect to 100 parts by weight of the primary components.

This composition barely forms oxygen defects in the ceramic composition during sintering, has high reduction resistance, has a high relative dielectric constant $\in_1$. and a high and stable Q value, and is capable of controlling the temperature coefficient $\tau_f$ of the resonant frequency to an appropriate level near zero ppm/° C.

EXAMPLES

The present invention will now be described with reference to the following Examples.

Barium carbonate ($BaCO_3$), neodymium oxide ($Nd_2O_3$), samarium oxide ($Sm_2O_3$), praseodymium oxide ($Pr_2O_{11/3}$) and titanium oxide ($TiO_2$) were prepared as starting materials for primary components, and bismuth oxide ($Bi_2O_3$) and iron oxide ($Fe_2O_3$) were prepared as starting materials for additional components (all the materials were powdered). In each sample, these materials were weighed in the ratio shown in Table 1, wherein coefficients x, y, z, m, and n represented molar ratios of the primary components in the formula $xBaO\text{-}yTiO_2\text{-}z\{(1\text{-}m\text{-}n)Nd_2O_3\text{-}mSm_2O_3\text{-}nPr_2O_{11/3}\}$, and the $Bi_2O_3$ content and the $Fe_2O_3$ content were represented by parts by weight to 100 parts by weight of the primary components.

These materials were wet-mixed using a ball mill, and the mixture was dehydrated, dried and then calcined at 1,000 to 1,200° C. for at least one hour. The calcined product was pulverized and was mixed with an organic binder. The mixture was molded and was sintered at 1,300 to 1,400° C. in air or a nitrogen atmosphere containing less than 0.1 percent by volume of oxygen to prepare a disk shaped sintered compact having a diameter of 10 mm and a thickness of 5 mm.

The specific dielectric constant $\in_r$ and the Q value of the sintered compact were measured at 25° C. and at a frequency of 4 to 5 GHz by the terminal-short-circuiting-type dielectric resonator method wherein the Q value was converted to a value at 1 GHz based on the rule Qxf=constant. The temperature coefficient f of the resonance frequency between 25° C. and 55° C. was determined from TEM mode resonance frequencies. The results are shown in Table 1, wherein a sample marked with an asterisk indicates that the composition of the sample is outside of the range of the present invention.

Table 1 shows that the samples having the compositions in accordance with the present invention exhibit high specific dielectric constant $\in_r$ and high Q values. Moreover, the temperature coefficient $\tau_f$ ppm/° C. of the resonance frequency can be controlled to an appropriate value near zero ppm/° C. Also, the samples of the present invention, which are sintered in a nitrogen or reducing atmosphere, have high Q values, since oxygen defects are not formed in the ceramic composition.

In summary, at an Fe content of about 0.3 percent or less by weight on the basis of $Fe_2O_3$, the reduction resistance can be improved without causing a decreased specific dielectric constant $\in_r$. At a $Pr_2O_{11/3}$ content n in a range of $0<n\leq0.25$, a sufficiently high specific dielectric constant $\in_r$ and a high Q value are achieved. Comparing sample 8 (outside of the present invention) and sample 10 (in accordance with the present invention), the ceramic composition in accordance with the present invention, which contains a small amount of $Fe_2O_3$ as an additional component, exhibits high reduction resistance without a decreased Q value after sintering in a nitrogen or reducing atmosphere. Comparing sample 10 (in accordance with the present invention) with sample 23 (outside of the present invention), a sufficiently high specific dielectric constant $\in_r$ and a desirable temperature coefficient $\tau f$ of the resonance frequency near zero are obtainable only when the $Pr_2O_{11/3}$ content is in the above range.

With reference to FIG. 6 and Table 1, the reasons for limitation of the contents of the primary components represented by the formula $xBaO\text{-}yTiO_2\text{-}z\{(1\text{-}m\text{-}n)Nd_2O_3\text{-}mSm_2O_3\text{-}nPr_2O_{11/3}\}$ and the additional Bi and Fe components will be described.

The coefficient x representing the BaO content is in a range of $0.13\leq x\leq0.16$ as shown in the ternary diagram in FIG. 6. When x<0.13, both the specific dielectric constant $\in_r$ and the Q value are low (see Samples 4 and 16 in Table 1). When x>0.16, the Q value is low and the temperature coefficient $\tau f$ of the resonance frequency significantly shifts to a positive side (see Samples 1 and 6).

The coefficient y representing the $TiO_2$ content is in a range of $0.68\leq y\leq0.70$ as shown in the ternary diagram in FIG. 6. When y<0.13, sintering is unsatisfactory (see Samples 3 and 5 in Table 1). When y>0.70, the temperature coefficient τf of the resonance frequency significantly shifts to a positive side (see Samples 21 and 22).

The coefficient z is in a range of $0.14 \leq z \leq 0.19$ as shown in the ternary diagram in FIG. 6. When z<0.14, the temperature coefficient τf of the resonance frequency significantly shifts to a positive side (see Samples 1 and 22 in Table 1). When y>0.19, sintering is unsatisfactory, the specific dielectric constant $\in_r$ and the Q value are low, and the temperature coefficient τf of the resonance frequency significantly shifts to a positive side (see Samples 3 and 16).

The coefficient m representing the $Sm_2O_3$ content is in a range of 0<m<0.40. When m=0, the temperature coefficient τf of the resonance frequency significantly shifts to a positive side (see Sample 20 in Table 1). When m>0.40, the temperature coefficient τf of the resonance frequency significantly shifts to a negative side (see Sample 7).

The coefficient n representing the $Pr_2O_{11/3}$ content is in a range of $0 < n \leq 0.25$. When n=0, the specific dielectric constant $\in_r$ is low and the temperature coefficient τf of the resonance frequency significantly shifts to a negative side (see Sample 23 in Table 1). When n>0.25, the Q value is low and the temperature coefficient τf of the resonance frequency significantly shifts to a positive side (see Sample 26).

The Bi content on the basis of $Bi_2O_3$ is more than 0 parts by weight to about 9 parts by weight. When the Bi content is 0 parts by weight, the temperature coefficient τf of the resonance frequency significantly shifts to a positive side (see Sample 15). When the Bi content exceeds about 9 parts by weight, the specific dielectric constant $\in_r$ and the Q value are low and the temperature coefficient τf of the resonance frequency significantly shifts to a positive side (see Sample 18).

The Fe content on the basis of $Fe_2O_3$ is more than 0 parts by weight to about 0.3 parts by weight. When the Fe content is 0 parts by weight, the Q value decreases due to oxygen defects by reduction after sintering in a nitrogen atmosphere (see Sample 8). When the Fe content exceeds about 0.3 parts by weight, the specific dielectric constant $\in_r$ and the Q value are low after sintering both in air and in a nitrogen atmosphere, and the temperature coefficient τf of the resonance frequency significantly shifts to a negative side (see Samples 13 and 14).

In the above Examples, bismuth oxide $Bi_2O_3$ and iron oxide $Fe_2O_3$ are added as the additional components before calcination of the primary components. These additional components may be added to the primary components after calcination of the primary components.

As described above, oxygen defects are barely formed in the ceramic composition during a sintering process in the present invention. Thus, the ceramic composition exhibits high reduction resistance during sintering, has a high relative dielectric constant $\in_r$ and a stable Q value in the microwave band, and can control the temperature coefficient τf of the resonant frequency to an appropriate value in the vicinity of zero ppm/° C.

Thus, the dielectric resonator, the dielectric filter, the dielectric duplexer, and the communication apparatus using the dielectric ceramic component having the above composition have also satisfactory characteristics.

TABLE 1

| Sample No. | Main Components (molar ratio) | | | | | Additional Components (parts by weight) | | Sintered in Air | | | Sintered in Nitrogen | | |
|---|---|---|---|---|---|---|---|---|---|---|---|---|---|
| | x | y | z | m | n | $Bi_2O_3$ | $Fe_2O_3$ | $\in_r$ | Q | Åf | $\in_r$ | Q | $\in f$ |
| *1 | 0.170 | 0.700 | 0.130 | 0.30 | 0.17 | 6.0 | 0.03 | 88 | 5800 | 35 | 91 | 5850 | 37 |
| 2 | 0.145 | 0.690 | 0.165 | 0.15 | 0.17 | 6.0 | 0.03 | 92 | 7280 | 7 | 92 | 7320 | 8 |
| *3 | 0.130 | 0.665 | 0.205 | 0.30 | 0.17 | 6.0 | 0.03 | Not Sintered | | | Not Sintered | | |
| *4 | 0.120 | 0.700 | 0.180 | 0.30 | 0.17 | 6.0 | 0.03 | 75 | 4130 | −9 | 75 | 4150 | −5 |
| *5 | 0.160 | 0.665 | 0.175 | 0.30 | 0.17 | 6.0 | 0.03 | Not Sintered | | | Not Sintered | | |
| *6 | 0.170 | 0.680 | 0.150 | 0.30 | 0.17 | 6.0 | 0.03 | 62 | 4320 | 45 | 61 | 4300 | 48 |
| *7 | 0.145 | 0.690 | 0.165 | 0.60 | 0.17 | 6.0 | 0.03 | 88 | 7860 | −20 | 87 | 7880 | −19 |
| *8 | 0.145 | 0.690 | 0.165 | 0.30 | 0.17 | 6.0 | 0 | 91 | 7320 | 2 | 90 | 1640 | 3 |
| 9 | 0.145 | 0.690 | 0.165 | 0.30 | 0.17 | 6.0 | 0.01 | 91 | 7420 | 1 | 90 | 5340 | 4 |
| 10 | 0.145 | 0.690 | 0.165 | 0.30 | 0.17 | 6.0 | 0.03 | 91 | 7500 | 3 | 90 | 7550 | 5 |
| 11 | 0.145 | 0.690 | 0.165 | 0.30 | 0.17 | 6.0 | 0.10 | 90 | 7520 | 0 | 90 | 7590 | 4 |
| 12 | 0.145 | 0.690 | 0.165 | 0.30 | 0.17 | 6.0 | 0.30 | 90 | 7640 | 0 | 89 | 7660 | 4 |
| *13 | 0.145 | 0.690 | 0.165 | 0.30 | 0.17 | 6.0 | 3.00 | 77 | 3720 | −19 | 77 | 1920 | −24 |
| *14 | 0.145 | 0.690 | 0.165 | 0.30 | 0.17 | 6.0 | 5.00 | 54 | 2520 | −35 | 52 | 1920 | −49 |
| *15 | 0.145 | 0.690 | 0.165 | 0.30 | 0.17 | 0 | 0.03 | 85 | 9960 | 45 | 84 | 9990 | 57 |
| *16 | 0.120 | 0.680 | 0.200 | 0.30 | 0.17 | 6.0 | 0.03 | 60 | 2270 | 31 | 61 | 2250 | 33 |
| 17 | 0.145 | 0.690 | 0.165 | 0.30 | 0.17 | 9.0 | 0.03 | 90 | 6280 | 4 | 82 | 6120 | 6 |
| *18 | 0.145 | 0.690 | 0.165 | 0.30 | 0.17 | 12.0 | 0.03 | 73 | 4440 | 20 | 64 | 4470 | 31 |
| *19 | 0.145 | 0.690 | 0.165 | 0 | 0 | 6.0 | 0.03 | 84 | 6200 | 15 | 85 | 6240 | 17 |
| *20 | 0.145 | 0.690 | 0.165 | 0 | 0.17 | 6.0 | 0.03 | 92 | 6120 | 31 | 90 | 6150 | 29 |
| *21 | 0.130 | 0.710 | 0.160 | 0.30 | 0.17 | 6.0 | 0.03 | 82 | 5260 | 28 | 84 | 5240 | 36 |
| *22 | 0.160 | 0.710 | 0.130 | 0.30 | 0.17 | 6.0 | 0.03 | 91 | 6270 | 45 | 91 | 6220 | 48 |
| *23 | 0.145 | 0.690 | 0.165 | 0.30 | 0 | 6.0 | 0.03 | 82 | 7620 | −22 | 85 | 7610 | −20 |
| 24 | 0.145 | 0.690 | 0.165 | 0.30 | 0.10 | 6.0 | 0.03 | 90 | 7580 | 0 | 89 | 7550 | 2 |
| 25 | 0.145 | 0.690 | 0.165 | 0.30 | 0.25 | 6.0 | 0.03 | 93 | 7480 | 5 | 92 | 7420 | 8 |
| *26 | 0.145 | 0.690 | 0.165 | 0.30 | 0.50 | 6.0 | 0.03 | 96 | 6100 | 24 | 94 | 6120 | 27 |
| 27 | 0.160 | 0.700 | 0.140 | 0.30 | 0.17 | 6.0 | 0.03 | 89 | 7100 | 11 | 89 | 7120 | 13 |
| 28 | 0.160 | 0.680 | 0.160 | 0.30 | 0.17 | 6.0 | 0.03 | 84 | 6960 | 8 | 83 | 6870 | 10 |
| 29 | 0.130 | 0.680 | 0.190 | 0.30 | 0.17 | 6.0 | 0.03 | 82 | 6740 | 12 | 80 | 6670 | 15 |
| 30 | 0.130 | 0.700 | 0.170 | 0.30 | 0.17 | 6.0 | 0.03 | 85 | 7080 | 2 | 85 | 6920 | 4 |

What is claimed is:

1. A high-frequency dielectric ceramic composition comprising Ba, Ti, Nd, Sm, and Pr as primary components and represented by the formula $xBaO\text{-}yTiO_2\text{-}z\{(1-m-n)Nd_2O_3\text{-}mSm_2O_3\text{-}nPr_2O_{11/3}\}$ wherein coefficients x, y, z, m, and n represent molar ratios, $x+y+z=1$, $0<m\leq 0.40$, $0<n\leq 0.25$, and the coefficients x, y, and z are in an area bounded by points A, B, C and D in a ternary diagram, wherein point A is at (x=0.16, y=0.70, z=0.14),
point B is at (x=0.16, y=0.68, z=0.16),
point C is at (x=0.13, y=0.68, z=0.19), and
point D is at (x=0.13, y=0.70, z=0.17);
wherein the composition further comprises a Bi compound in an amount of more than 0 parts by weight to about 9 parts by weight calculated as $Bi_2O_3$ and an Fe compound in an amount of more than 0 parts by weight to about 0.3 parts by weight calculated as $Fe_2O_3$ as additional components with respect to 100 parts by weight of the primary components.

2. A high-frequency dielectric ceramic composition according to claim 1, wherein the amount of Bi compound does not exceed 6 parts and the amount of Fe compound is 0.1 to 0.3 parts.

3. A high-frequency dielectric ceramic composition according to claim 2, wherein $0.1\leq m\leq 0.3$ and $0.1\leq n\leq 0.17$.

4. A high-frequency dielectric ceramic composition according to claim 1, wherein $0.1\leq m\leq 0.3$ and $0.1\leq n\leq 0.17$.

5. A dielectric resonator comprising a dielectric ceramic component and input/output terminals, the dielectric resonator operating by electromagnetically coupling the dielectric ceramic component to the input/output terminals, wherein the dielectric ceramic component comprises a high-frequency dielectric ceramic composition according to claim 4.

6. A dielectric filter comprising a dielectric resonator according to claim 5 in combination with external couplers.

7. A dielectric duplexer comprising:
at least two dielectric filters;
input and output connectors connected to each of the dielectric filters; and
an antenna connector commonly connected to the dielectric filters;
wherein at least one of the dielectric filters is a dielectric filter according to claim 6.

8. A communication apparatus comprising:
a dielectric duplexer according to claim 7;
a transmitting circuit connected to an input connector of the dielectric duplexer;
a receiving circuit connected to an output connector of the dielectric duplexer; and
an antenna connected to the antenna connector of the dielectric duplexer.

9. A dielectric resonator comprising a dielectric ceramic component and input/output terminals, the dielectric resonator operating by electromagnetically coupling the dielectric ceramic component to the input/output terminals, wherein the dielectric ceramic component comprises a high-frequency dielectric ceramic composition according to claim 3.

10. A dielectric filter comprising a dielectric resonator according to claim 9 in combination with external couplers.

11. A dielectric duplexer comprising:
at least two dielectric filters;
input and output connectors connected to each of the dielectric filters; and
an antenna connector commonly connected to the dielectric filters;
wherein at least one of the dielectric filters is a dielectric filter according to claim 10.

12. A communication apparatus comprising:
a dielectric duplexer according to claim 11;
a transmitting circuit connected to an input connector of the dielectric duplexer;
a receiving circuit connected to an output connector of the dielectric duplexer; and
an antenna connected to the antenna connector of the dielectric duplexer.

13. A dielectric resonator comprising a dielectric ceramic component and input/output terminals, the dielectric resonator operating by electromagnetically coupling the dielectric ceramic component to the input/output terminals, wherein the dielectric ceramic component comprises a high-frequency dielectric ceramic composition according to claim 2.

14. A dielectric filter comprising a dielectric resonator according to claim 13 in combination with external couplers.

15. A dielectric duplexer comprising:
at least two dielectric filters;
input and output connectors connected to each of the dielectric filters; and
an antenna connector commonly connected to the dielectric filters;
wherein at least one of the dielectric filters is a dielectric filter according to claim 14.

16. A communication apparatus comprising:
a dielectric duplexer according to claim 15;
a transmitting circuit connected to an input connector of the dielectric duplexer;
a receiving circuit connected to an output connector of the dielectric duplexer; and
an antenna connected to the antenna connector of the dielectric duplexer.

17. A dielectric resonator comprising a dielectric ceramic component and input/output terminals, the dielectric resonator operating by electromagnetically coupling the dielectric ceramic component to the input/output terminals, wherein the dielectric ceramic component comprises a high-frequency dielectric ceramic composition according to claim 1.

18. A dielectric filter comprising a dielectric resonator according to claim 17 in combination with external couplers.

19. A dielectric duplexer comprising:
at least two dielectric filters;
input and output connectors connected to each of the dielectric filters; and
an antenna connector commonly connected to the dielectric filters;
wherein at least one of the dielectric filters is a dielectric filter according to claim 18.

20. A communication apparatus comprising:
a dielectric duplexer according to claim 19;
a transmitting circuit connected to an input connector of the dielectric duplexer;
a receiving circuit connected to an output connector of the dielectric duplexer; and
an antenna connected to the antenna connector of the dielectric duplexer.

* * * * *